United States Patent
Minnich et al.

(10) Patent No.: US 12,048,263 B2
(45) Date of Patent: Jul. 30, 2024

(54) FLEXIBLE COUPLER FOR FEEDER SHAFT OF COMBINE HARVESTER

(71) Applicant: CNH Industrial America LLC, New Holland, PA (US)

(72) Inventors: Michael Minnich, Elizabethtown, PA (US); Cale Boriack, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 619 days.

(21) Appl. No.: 17/313,405

(22) Filed: May 6, 2021

(65) Prior Publication Data
US 2022/0354058 A1   Nov. 10, 2022

(51) Int. Cl.
*A01B 71/06* (2006.01)
*A01D 41/16* (2006.01)
(Continued)

(52) U.S. Cl.
CPC .............. *A01B 71/06* (2013.01); *A01D 41/16* (2013.01); *A01D 61/02* (2013.01); *A01D 69/06* (2013.01);
(Continued)

(58) Field of Classification Search
CPC . A01B 71/06; F16D 3/74; F16D 3/185; F16H 55/56; F16H 1/48; F16C 2361/41; F16C 23/086; B64C 25/40; B63H 21/305; A01D 69/06; A01D 61/02; A01D 61/008; A01D 41/16

See application file for complete search history.

(56) References Cited

U.S. PATENT DOCUMENTS 2,146,766 A * 2/1939 Ricefield .................. F16D 3/74
  464/91
2,869,660 A * 1/1959 Krause .................. A01B 71/06
  180/14.4
(Continued)

FOREIGN PATENT DOCUMENTS

DE  4326558 A1 * 2/1995 ........... B63H 21/305
EP  0050920 A2 * 5/1982 ............. F16H 55/56
(Continued)

OTHER PUBLICATIONS

Extended European Search Report for EP Application No. 22171929.7 dated Sep. 26, 2022 (six pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A flexible and rotatable coupling assembly for a feeder conveyor of a combine harvester, for example. The coupling assembly connects a first rotatable shaft to a second rotatable shaft. The coupling assembly includes a spherical bearing that is connectable to the first rotatable shaft for accommodating a radial or angular misalignment between the first and second rotatable shafts; and a flexible and rotatable coupler that is non-rotatably connectable to the first and second rotatable shafts for transferring rotation between the first and second rotatable shafts. The flexible and rotatable coupler is either directly or indirectly connected to the spherical bearing. The flexible and rotatable coupler has a flexible component for accommodating the radial or angular misalignment.

12 Claims, 3 Drawing Sheets

(51) Int. Cl.
  *A01D 61/02* (2006.01)
  *A01D 69/06* (2006.01)
  *F16D 3/18* (2006.01)
  *F16D 3/74* (2006.01)
  *A01D 61/00* (2006.01)
  *B63H 21/30* (2006.01)
  *B64C 25/40* (2006.01)
  *F16H 1/48* (2006.01)
  *F16H 55/56* (2006.01)

(52) U.S. Cl.
  CPC ............... *F16D 3/185* (2013.01); *F16D 3/74* (2013.01); *A01D 61/008* (2013.01); *B63H 21/305* (2013.01); *B64C 25/40* (2013.01); *F16H 1/48* (2013.01); *F16H 55/56* (2013.01)

(56) References Cited

U.S. PATENT DOCUMENTS

| | | | |
|---|---|---|---|
| 3,431,711 A * | 3/1969 | Claas | A01D 41/12 |
| | | | 56/DIG. 9 |
| 4,090,416 A * | 5/1978 | Hicks | F16H 1/48 |
| | | | 475/5 |
| 4,198,832 A * | 4/1980 | Pauli | F16D 3/74 |
| | | | 464/154 |
| 4,227,654 A | 10/1980 | Seefeld et al. | |
| 4,266,395 A * | 5/1981 | Basham | A01D 75/287 |
| | | | 56/16.2 |
| 4,510,948 A | 4/1985 | Dekeyzer | |
| 5,265,404 A | 11/1993 | Aldred et al. | |
| 5,356,338 A | 10/1994 | Braunhardt et al. | |
| 5,950,409 A | 9/1999 | Davies et al. | |
| 7,090,070 B2 | 8/2006 | Linder | |
| 7,461,498 B1 | 12/2008 | Barnett | |
| 2004/0163374 A1* | 8/2004 | Rickert | A01D 41/142 |
| | | | 56/16.4 R |
| 2004/0187461 A1* | 9/2004 | Rickert | A01D 69/00 |
| | | | 56/80 |
| 2008/0006014 A1* | 1/2008 | Guske | A01B 71/063 |
| | | | 56/15.6 |
| 2008/0256914 A1* | 10/2008 | Ricketts | A01D 41/16 |
| | | | 56/10.8 |
| 2012/0317951 A1* | 12/2012 | Vereecke | A01D 41/16 |
| | | | 56/14.9 |
| 2016/0154376 A1 | 6/2016 | Xiao et al. | |
| 2017/0241484 A1 | 8/2017 | Bonte et al. | |
| 2017/0269547 A1 | 9/2017 | Zeng et al. | |

FOREIGN PATENT DOCUMENTS

| | | | | |
|---|---|---|---|---|
| EP | 3165739 | A1 | 5/2017 | |
| EP | 3610717 | A1 | 2/2020 | |
| GB | 2337803 | A * | 12/1999 | ............ F16D 3/185 |
| GB | 2525057 | A * | 10/2015 | ............ B64C 25/40 |
| GB | 2525057 | A | 10/2015 | |
| WO | 2020/1648768 | A1 | 8/2020 | |

* cited by examiner

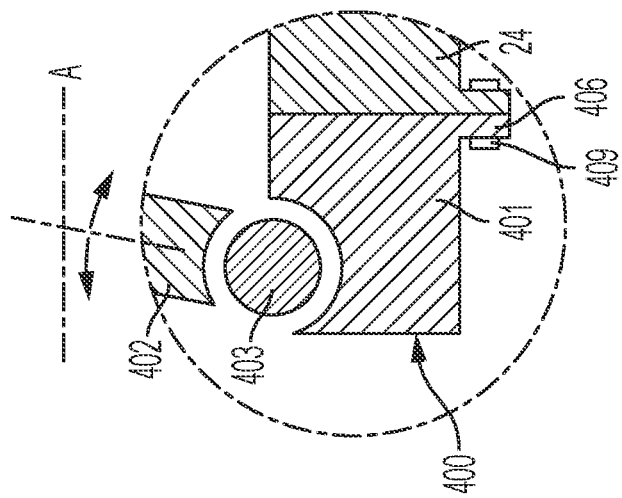
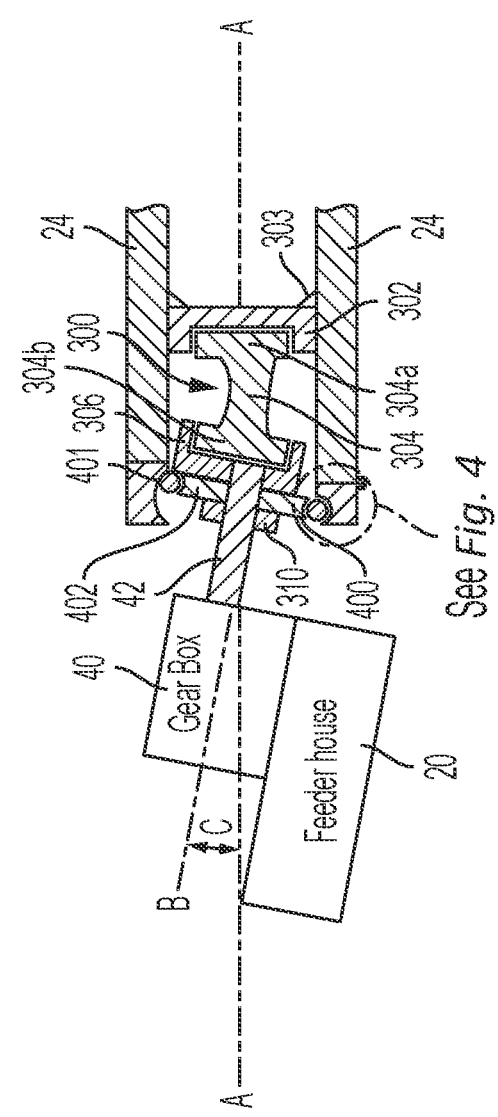

FLEXIBLE COUPLER FOR FEEDER SHAFT OF COMBINE HARVESTER

FIELD OF THE INVENTION

The present invention relates to a flexible coupler for a feeder shaft of a combine harvester.

BACKGROUND OF THE INVENTION

As is described in U.S. Pat. No. 7,090,070 to CNH America LLC (the '070 Patent), which is incorporated by reference in its entirety and for all purposes, FIG. 1 depicts an agricultural combine 10 including a representative header 12 for cutting and harvesting crops, and a feeder 14 connected to the header including a rotatable feeder conveyor 16 for conveying the crops to a rotatable threshing mechanism 18 of combine 10, as generally denoted by arrow A.

Referring also to FIG. 2, feeder conveyor 16 of feeder 14 is contained within a feeder housing 20 (also referred to herein as feederhouse 20), and includes a forwardly located drum 22 and a rearwardly located driveshaft 24 encircled by a plurality of endless feeder chains 26 connected together by a plurality of transversely extending slats 28. Driveshaft 24 is rotatable for moving feeder chain 26 and slats 28 therearound and around drum 22, for carrying crop material introduced into feeder housing 20 denoted at arrows B, along a bottom surface of feeder housing 20, as shown by arrows A in FIG. 1, for delivery to threshing mechanism 18, as denoted by arrows B, in the well-known conventional manner.

The upper spans of feeder chains 26 are supported between drum 22 and driveshaft 24 by an upper chain support structure 30 including one or more elongate, rectangular sheet metal members 32 having an upwardly facing planar outer surface 34, and an opposite, downwardly facing inner surface 36, which defines and encloses the upper extent of a space 38. Chains 26 are supported on outer surface 34 of sheet metal member 32 for longitudinal movement therealong.

A gearbox 40 may be connected to feederhouse 20 in a stationary manner. Gearbox 40, which is driven by a motor (not shown), includes an output shaft 42. Output shaft 42 is directly connected to driveshaft 24 for rotating driveshaft 24 about its longitudinal axis and, consequently, moving chains 26, as was described above. The connection between driveshaft 24 and output shaft 42 may be a spline connection, for example. During operation of combine 10, feederhouse 20 can be subject to twisting, loads, moments, tolerance mismatches, etc., thereby resulting in a radial or angular misalignment between driveshaft 24 and output shaft 42. The radial or angular misalignment between driveshaft 24 and output shaft 42 results in a radial load at the interface between driveshaft 24 and output shaft 42. The radial load can cause the spline connection between driveshaft 24 and output shaft 42 to wear. The angular or axial misalignment is depicted by angle C in FIG. 3.

In view of the foregoing, it would be desirable to compensate for the above described radial load in an effort to reduce stresses and resultant wear at the interface between driveshaft 24 and output shaft 42 of gearbox 40.

SUMMARY OF THE INVENTION

According to one aspect of the invention, a flexible and rotatable coupling assembly connects a first rotatable shaft to a second rotatable shaft. The coupling assembly includes a spherical bearing that is connectable to the first rotatable shaft for accommodating a radial or angular misalignment between the first and second rotatable shafts; and a flexible and rotatable coupler that is non-rotatably connectable to the first and second rotatable shafts for transferring rotation between the first and second rotatable shafts. The flexible and rotatable coupler is either directly or indirectly connected to the spherical bearing. The flexible and rotatable coupler has a flexible component for accommodating the radial or angular misalignment.

According to another aspect of the invention, a feeder conveyor for a combine harvester comprises a gear box having a rotatable output shaft; a rotatable driveshaft for moving chains of the feeder conveyor; and a flexible and rotatable coupling assembly for connecting the output shaft to the driveshaft. The coupling assembly comprises a spherical bearing that is connected to the driveshaft for accommodating a radial or angular misalignment between the driveshaft and the output shaft; and a flexible and rotatable coupler that is non-rotatably connected to the driveshaft and the output shaft for transferring rotation between the driveshaft and the output shaft. The flexible and rotatable coupler is either directly or indirectly connected to the spherical bearing. The flexible and rotatable coupler has a flexible component for accommodating the radial or angular misalignment

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a simplified schematic representation of a coupling interface between an output shaft of a gearbox and a driveshaft of the feeder, wherein the coupling interface is depicted in a flexed state; and FIG. 4 is a detailed view of FIG. 3.

DETAILED DESCRIPTION OF THE INVENTION

Figure 1:
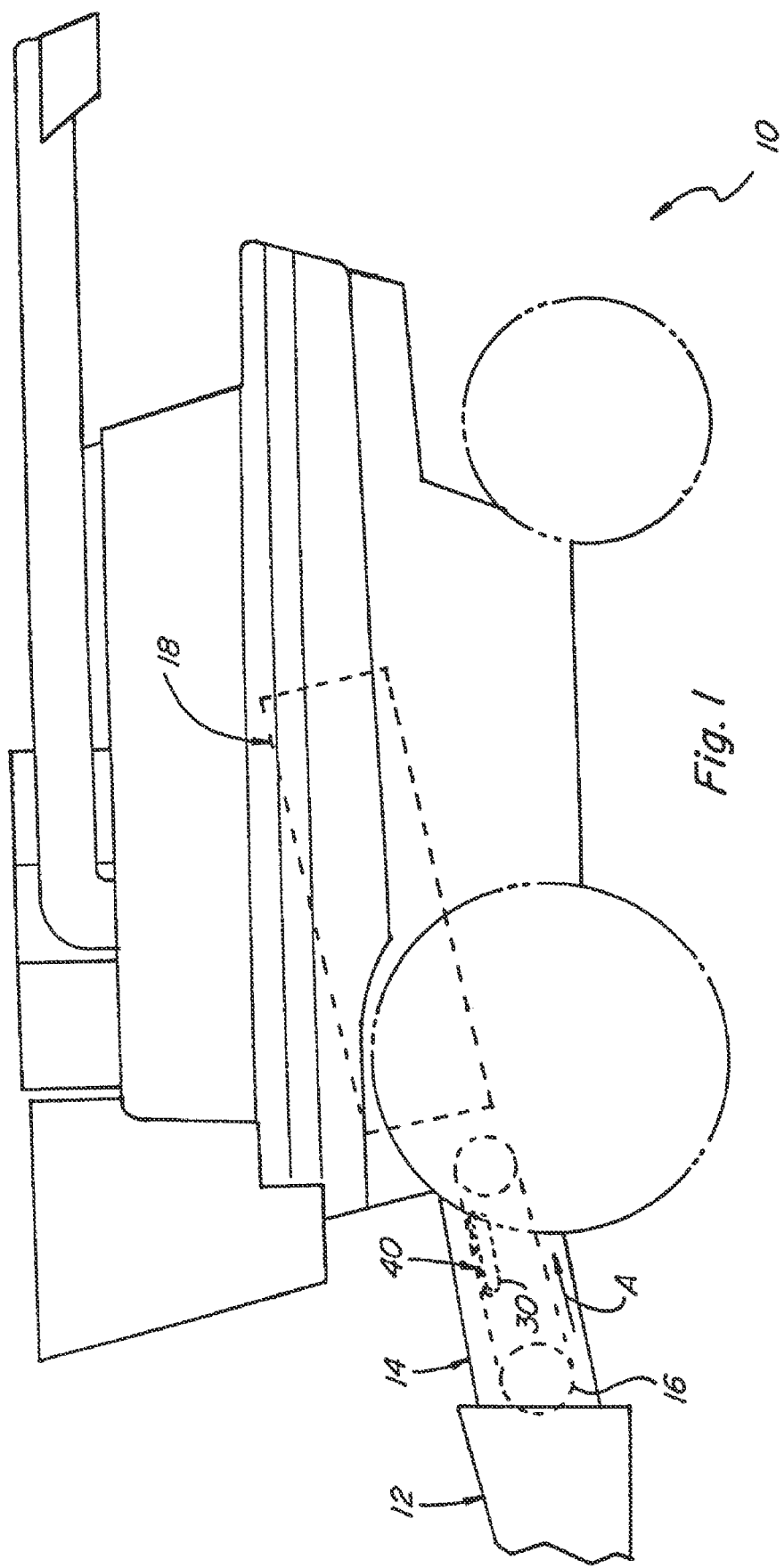
FIG. 1 is a simplified side elevational representation of an agricultural combine including a feeder according to the present invention.
Figure 2:
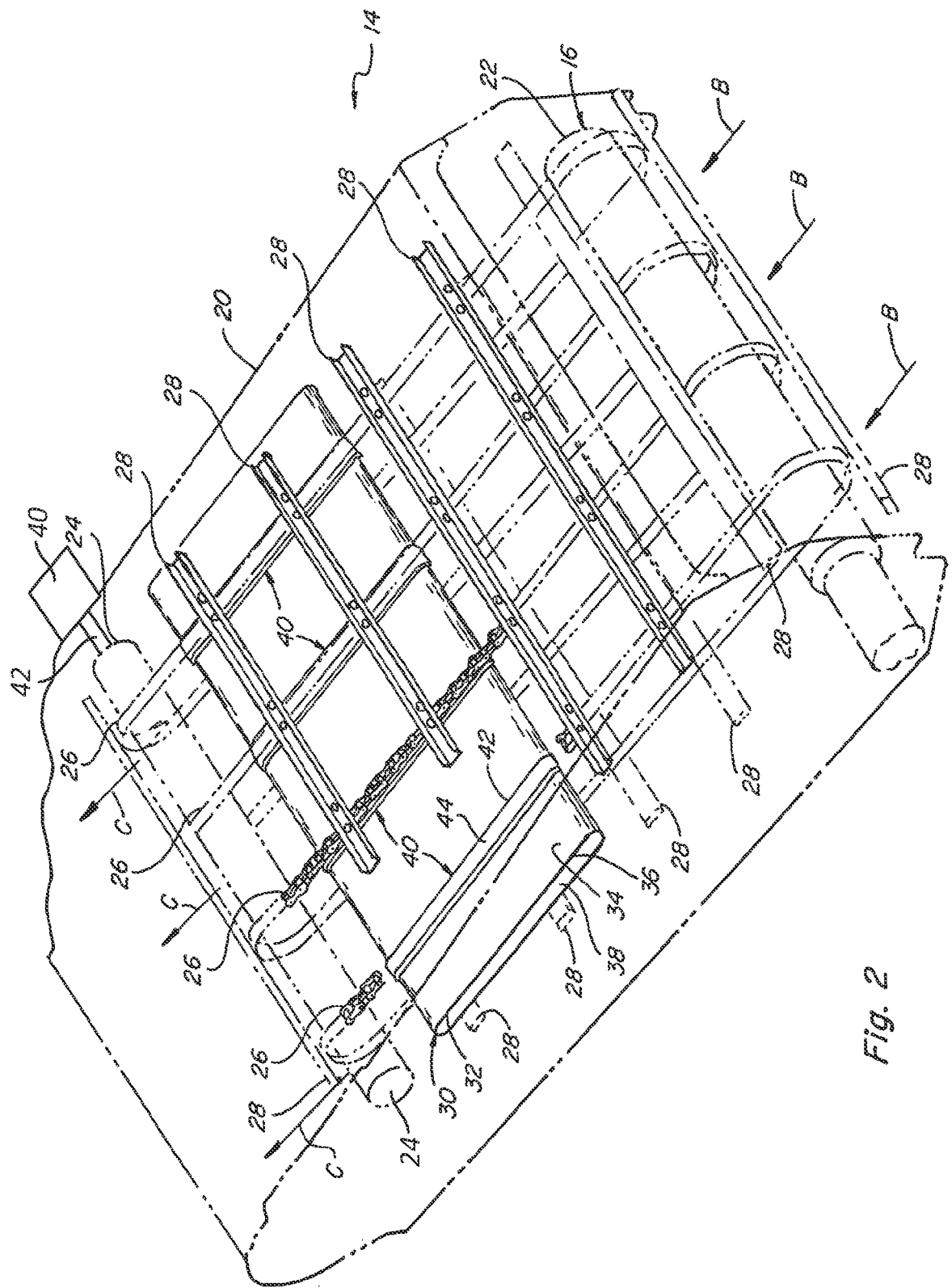
FIG. 2 is an enlarged, simplified perspective view of the feeder of FIG. 1.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Also the terms "forward", "rearward", "left" and "right", for example, when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

FIG. 3 depicts a flexible and rotatable coupling assembly that interconnects the hollow driveshaft 24 and output shaft 42 of gearbox 40. The coupling assembly generally comprises a three-piece flexible coupler 300, a spherical bearing 400 and an optional fastener 310.

Three-piece flexible coupler 300 comprises a first component 302 having a cylindrical body that is welded (or otherwise fastened) to the interior diameter of the driveshaft 24 such that the first component 302 and driveshaft 24 are non-rotatable with respect to each other (in other words those components only rotate together). The welded joint 303 is shown in FIG. 3. First component 302 may be metallic. First component 302 includes a recessed central portion on one side thereof having a non-circular shape, splines or gear teeth for meshing with a non-circular shape, splines or gear teeth of a second component 304 of coupler 300.

Second component 304 has a cylindrical dumb-bell shaped body including a narrow central waist and two bulbous cylindrical ends 304a and 304b and is composed of a resiliently flexible material, such as rubber, plastic or spring steel. The diameter, material and length, for example, can be tailored to achieve a particular quality of elastic deformation and flexibility.

In use, second component 304 can resiliently deform to compensate for the radial load at the interface between driveshaft 24 and output shaft 42, which was described in the Background section. FIG. 3 shows a radial load applied to coupler 300, and second component 304 maintained in a flexed state of elastic deformation to accommodate the radial load. In the state of radial load, the rotational axis B of the output shaft 42 of the gearbox 40 is angled at angle C with respect to the rotational and longitudinal axis A of the driveshaft 24 due to the flexion of second component 304. It should be understood that first and third components 302 and 306 are not maintained in a state of flexion in FIG. 3.

Second component 304 includes a first end 304a having a non-circular shape, splines or gear teeth on the outer perimeter of the revolved surface for meshing with a non-circular shape, splines or gear teeth of first component 302, as noted above, such that the first and second components 302 and 304 are non-rotatably connected. Second component 304 also includes a second end 304b having a non-circular shape, splines or gear teeth on its outer perimeter for meshing with a non-circular shape, splines or gear teeth of a third component 306, such that the second and third components 304 and 306 are non-rotatably connected.

Third component 306 has a cylindrical body that may be composed of a metallic material, for example. A central opening is provided in third component 306 through which the free end of output shaft 42 is positioned. Output shaft 42 is keyed to the central opening by a non-circular shape, splines or gear teeth, for example, such that output shaft 42 is non-rotatably connected to output shaft 42. Third component 306 includes a recessed central portion on one side thereof having a non-circular shape, splines or gear teeth for meshing with a non-circular shape, splines or gear teeth of the second end 304b of the second component 304 as noted above, such that the second and third components 304 and 306 are non-rotatably connected. Neither the second nor third components 304 and 306 are directly connected to the driveshaft 24.

It should be understood that even in a flexed state of the coupler 300, the components of the coupler 300 are still engaged with each other and can transfer rotation.

It should also be understood that the flexibility and elasticity of the material of second component 304 is greater than that of the first and third components.

Spherical bearing 400 is mounted to a side of third component 306 opposite second component 304. Output shaft 42 is directed through a central opening formed in bearing 400. The central opening in bearing 400 may or may not be keyed to output shaft 42. Bearing 400 is not also necessarily fixed to third component 306. Details of bearing 400 will be described later.

Fastener 310 is responsible for maintaining the components of coupler 300 in a state of compression with each other such that the components of the coupler 300 do not become detached from each other. Fastener 310 is a cylindrical body that is mounted to a side of bearing 400 opposite third component 306. Fastener 310 is fastened to the output shaft 342 by way of either mechanical threads or a pinned connection that passes through both output shaft 342 and fastener 310, for example. Alternatively, fastener 310 may simply represent a pin that passes through an opening in output shaft 342. Fastener 310 may be omitted, if desired, so long as bearing 400 can maintain the components of the coupler 300 in a state of compression (i.e., sandwiched against one another). Also, fastener 310 may be a bearing lock collar or an eccentric lock collar.

Referring now to the details of the spherical bearing 400, the spherical bearing 400 is mounted to one end of driveshaft 24. Bearing 400 is best shown in the detailed view of FIG. 4. Bearing 400 includes an outer race 401 having a hemispherical shaped channel, an inner race 402 also a hemispherical shaped channel, and bearing elements 403 positioned within those hemi-spherical shaped channels. A flange 406 on bearing 400 is connected to a mating flange on driveshaft 24, and a fastener 409 is utilized to connect those flanges. It should be understood that other ways exist for fastening bearing 400 to drive shaft 24, such as, for example, welding, clamps, threads, pins, fasteners, etc.

The spherical bearing 400 is commonly referred to as a plain spherical bearing. Bearing 400 may vary from that which is shown and described. Bearing 400 may be a ball bearing. Bearing 400 may be a barrel shaped roller or an hourglass-shaped roller. The bearing element 403 may be a ball, a tapered roller, a needle roller, or a spherical roller. Other types of spherical bearings are known in the art and may be useful here.

In operation, gear box 40 rotates output shaft 42 about axis B, and output shaft 42 rotates (at least) third component 306 of coupler 300. Due to the connection of the components of coupler 300 and the welded joint 303, rotation of third component 306 results in rotation of driveshaft 24, which results in movement of the chains 26 (as described above). Chains 26 may be replaced with belts. Any radial or angular misalignment (and consequent radial load) between the output shaft 42 and the driveshaft 24 (see angle C) is absorbed by flexion of flexible component 304 of the coupler 300. The bearing 400 adjusts to the misalignment by the inner race 402 pivoting with respect to the outer race 401, or vice versa, as is shown in FIG. 3. As noted above, it is desirable to compensate for the above described radial load in an effort to reduce stresses and resultant wear at the interface between driveshaft 24 and output shaft 42 of gearbox 40.

It should be understood that the coupler 300 is not limited for use with a drive shaft 24 of a feeder. Coupler 300 may be employed at the interface between an output shaft and any device (e.g., beater, rotor, drive shaft, shaft, transmission, motor, etc.) that could be subject to radial or angular misalignment with respect to the output shaft.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feeder conveyor for a combine harvester comprising:
   a gear box having a rotatable output shaft that is configured to rotate about a longitudinal axis;
   a rotatable driveshaft for moving belts or chains of the feeder conveyor; and
   a flexible and rotatable coupling assembly connecting the output shaft to the driveshaft, said coupling assembly comprising:
   (i) a spherical bearing that is connected to the driveshaft for accommodating a radial or angular misalignment between the driveshaft and the output shaft; and
   (ii) a flexible and rotatable coupler that is non-rotatably connected to the driveshaft and the output shaft for transferring rotation between the driveshaft and the output shaft, wherein the flexible and rotatable coupler is either directly or indirectly connected to the spherical bearing, said flexible and rotatable coupler having a flexible component that is configured for accommodating the radial or angular misalignment, the flexible component including an elongated body extending along the longitudinal axis, the elongated body having opposing first and second ends that are spaced apart along the longitudinal axis and a reduced thickness portion disposed between the first and second ends, wherein the first end is non-rotatably connected to the driveshaft and the second end is non-rotatably connected to the output shaft.

2. The feeder conveyor of claim 1, further comprising a fastener for at least partially securing the coupling assembly to the rotatable driveshaft.

3. The feeder conveyor of claim 1, wherein the coupler comprises a first component that is connectable to the driveshaft and the first end of the flexible component, a second component that is either directly or indirectly connected to the spherical bearing and the second end of the flexible component, and wherein the flexible component of the coupler is positioned between the first and second components.

4. The feeder conveyor of claim 3, wherein the flexible component is composed of either rubber or plastic.

5. The feeder conveyor of claim 3, wherein the first and second components are composed of a material having a lower flexibility than the flexible component.

6. The feeder conveyor of claim 3, wherein the first and second components are composed of metal.

7. The feeder conveyor of claim 3, wherein the first, second and flexible components of the coupler are non-rotatably connected together.

8. The feeder conveyor of claim 3, wherein the first, second and flexible components of the coupler are non-rotatably connected together by gear teeth or a non-circular shape, splines.

9. The feeder conveyor of claim 3, wherein the flexible component has a dumbbell shape, wherein the first and second ends have a bulbous shape and the reduced thickness portion comprises a reduced diameter waist portion of the dumbbell shape.

10. The feeder conveyor of claim 1, wherein the spherical bearing includes an inner race that is positioned about the output shaft, an outer race that is fixed to the rotatable driveshaft, and one or more bearing members that are positioned between the inner race and the outer race.

11. The feeder conveyor of claim 1, wherein the flexible component is composed of a flexible material.

12. A combine harvester comprising the feeder conveyor of claim 1.

* * * * *